US006040065A

United States Patent [19]

Eisan

[11] Patent Number: 6,040,065

[45] Date of Patent: Mar. 21, 2000

[54] METHOD FOR PRODUCING A METAL MATRIX FOR MOSAIC STRUCTURES

[76] Inventor: Andrew Eisan, 1611 Ward St., Durham, N.C. 27707

[21] Appl. No.: 09/217,374

[22] Filed: Dec. 21, 1998

[51] Int. Cl.[7] .............................. B44C 5/08; B44F 1/06; B23K 1/20

[52] U.S. Cl. .............................. 428/614; 428/38; 428/67; 228/121

[58] Field of Search .............................. 428/38, 44, 45, 428/67, 608, 614; 228/121, 122.1, 178, 185, 189, 204, 246, 248.1, 250

[56] References Cited

U.S. PATENT DOCUMENTS

| | | | |
|---|---|---|---|
| H1306 | 5/1994 | Drach | 428/608 |
| 303,359 | 8/1884 | Belcher | 428/38 |
| 317,077 | 5/1885 | Belcher | 428/38 |
| 396,911 | 1/1889 | Belcher | 205/114 |
| 396,912 | 1/1889 | Belcher | 249/83 |
| 1,291,878 | 1/1919 | Hess | 428/608 |
| 2,530,552 | 11/1950 | Stoddard | 228/204 |
| 2,577,187 | 12/1951 | Fox | 428/608 |
| 2,991,213 | 7/1961 | Williams | 428/38 |
| 3,000,339 | 9/1961 | Coxe | 228/204 |
| 3,031,996 | 5/1962 | Botvin | 428/614 |
| 3,605,902 | 9/1971 | Ault | 428/608 |
| 4,172,547 | 10/1979 | DelGrande | 228/121 |
| 4,252,847 | 2/1981 | DelGrande | 428/38 |
| 4,255,475 | 3/1981 | DelGrande | 428/44 |
| 4,482,912 | 11/1984 | Chiba et al. | 428/614 |
| 4,529,836 | 7/1985 | Powers et al. | 228/189 |
| 4,752,537 | 6/1988 | Das | 428/614 |
| 4,875,616 | 10/1989 | Nixdorf | 428/614 |
| 4,962,003 | 10/1990 | Lhymn et al. | 428/614 |
| 5,089,356 | 2/1992 | Chung | 428/614 |

OTHER PUBLICATIONS

Krueger, B.E. "Belcher Mosaic Stained Glass" *Stained Glass* v.89(1) p. 21–30, 1994 (No Month).

*Primary Examiner*—John J. Zimmerman

[57] ABSTRACT

A method for producing a metal matrix (32) which binds inclusions (12,15) in a stable structure (31) so that the surface areas of two opposing sides of each inclusion (12,15) are visible, thus enabling translucency. This method comprises the steps of securing inclusions (12,15) to a temporary backing (38) so that there are intervals (14) between the inclusions (12,15), depositing a metal fiber substrate (42) into the intervals (14) between the inclusions (12,15), and then melting a metal infiltrate (46) so that the infiltrate (46) coats the individual fibers and fills the spaces between the fibers. Upon cooling, the amalgam (48) of substrate (42) and infiltrate (46) thus formed constitutes the matrix (32) and border (34) of the structure (31). The inclusions (12,15) may be glass, marble, clay, metal, or other materials; the metal fiber substrate (42) is preferably fine bronze fiber and the infiltrate (46) is preferably conventional solder. The matrix (32) produced is flangeless which makes this method particularly suitable for producing translucent mosaic structures or, viewed alternatively, stained glass structures utilizing very small pieces of glass. The metal fiber substrate (42) and its method of deposition make this matrix (32) both cost-effective and stable over other methods which might be adapted to yield similar structures.

16 Claims, 2 Drawing Sheets

METHOD FOR PRODUCING A METAL MATRIX FOR MOSAIC STRUCTURES

BACKGROUND - FIELD OF INVENTION

This invention relates to the field of structures consisting of elements bound together by a metal matrix and more specifically to the fields of mosaic craft and stained glass craft

BACKGROUND - DESCRIPTION OF PRIOR ART

Traditional mosaic craft teaches a method of embedding small pieces or inclusions of glass or marble in a matrix of mortar or cement. These inclusions are typically small and roughly cube-shaped. As shown in FIG. 1, the mortar matrix 13 covers the back side of each inclusion 12 and fills the intervals 14 between inclusions so that only one surface, the front surface, of each inclusion is visible.

The value of a mosaic structure is in the overall pattern that these surface areas present to the viewer. A significant advantage of the mortar matrix is that it does not obscure any portion of the front surface. Thus, it enables the use of inclusions which are quite small.

Suppose, however, that one desires to build a mosaic structure where both the front and back of each inclusion is visible and exposed. One reason for doing so might be to allow transparency. If this case, mortar may be present only in the intervals between the inclusions—when this is so, the amount of mortar present is not sufficient to support the overall structure under normal conditions and the structure as a whole will easily disintegrate.

The two traditional methods of building stained glass structures are commonly known as the lead came method and the copper foil method. As shown in FIG. 2, the lead came method requires that the matrix 16 filling the intervals 14 between the individual inclusions of glass 12 consist of preformed lead strips called came. These are shaped in cross-section like the letter H.

As shown in FIG. 3, the copper foil method requires that the edges of each inclusion of glass 12 be wrapped with copper foil 18 slightly wider than the thickness of the glass and that the excess be pressed flat against the front and back surfaces of the piece. The wrapped inclusions of glass are placed adjacent to one another and a solder bead 20 is formed along those parts of the foil which have been pressed against the surface. This forms an amalgam of copper and solder which also fills any intervals 14 between the inclusions. This amalgam is the matrix 22 of the copper foil structure.

The matrices of the lead came and copper foil methods are structurally very similar and they have the advantage of:

(a) enabling structures where a portion of both the front side and back side of each inclusion are visible, and (b) relative strength.

As a result, they enable stable, translucent structures.

These matrices share the disadvantage that, unlike mortar, they do not easily allow the use of small, mosaic-sized inclusions. Consider the following:

The goals and values of traditional stained glass craft are realized with inclusions of glass which typically have a surface area ranging in size from 5 cm. sq. to 500 cm. sq. In contrast, the goals and values of mosaic craft are achieved with inclusions of glass or marble which have much smaller surface areas; typically, the surface area is in the range of 5 mm. sq. to 25 mm. sq. Another way of looking at this is that a typical inclusion of glass in a classical mosaic has a surface area approximately 100–1000 times smaller than a typical stained glass inclusion.

Two significant problems emerge when the matrices of the lead came and copper foil methods are employed to bind such small inclusions:

First is that the ratio of visible inclusion surface area to obscured surface area decreases dramatically. As shown in FIG. 4, both matrices have a heart 24 and a flange 26 which is of relatively invariant size. This flange obscures a portion 28 of the surface area of the inclusion 12.

When this obscured portion 28 remains relatively constant and the overall size of the inclusion drops by a factor of 100–1000, the ratio of obscured surface area 28 to visible surface area 30 increases dramatically. A side effect is that any enabled translucency is severely diminished.

Second is that of direct labor cost. These matrices are labor intensive and the amount of labor required to produce a structure of a given size is proportional to the total linear amount of matrix required to surround the inclusions. The linear amount of matrix is, in turn, proportional to the size and number of pieces required to complete the structure. In effect, a structure of mosaic-sized inclusions produced by the lead came or copper foil methods might require well over 100 times the labor required for a traditional stained glass structure of the same size Although the traditional methods of mosaic craft and stained glass craft fail to meet the goal of a matrix which binds mosaic size inclusions so that opposing sides are visible, and the visible surface area of the inclusions is much greater than the obscured area of the inclusions, and the matrix is structurally sound, there are two other solutions which are worth examining.

H. F. Belcher describes a method (U.S. Pat. Nos. 303,359 (1884); 317,077 (1885); 396,911 (1889); 396,912 (1889)) for producing a matrix which appears to have several advantages:

(a) The matrix enables two opposing surfaces of each inclusion to be visible, (b) The matrix is potentially flangeless and hence can allow a high ratio of visible surface area to obscured surface area regardless of the size of the inclusion, (c) The matrix is reasonably strong and enables a stable structure, (d) The direct labor cost of Belcher's matrix is relatively independent of the number and size of inclusions in the structure. Thus, unlike the lead came and copper foil methods, the direct labor cost is not significantly increased by the use of mosaic size inclusions.

I would argue, however, that the direct labor cost of his method was invariably high, albeit independent of inclusion size. This is because formation of his matrix apparently required several skilled workmen working in concert over a long period of time. Further disadvantages of Belcher's matrix are that it:

(a) requires significant capital investment in furnaces, vestments, cranes, etc.

(b) requires materials, e.g., asbestos, and practices which would be today considered unsafe and detrimental to the health of the producers.

DelGrande describes a method (U.S. Pat. Nos. 4,172,547 (1979); 4,252,847 (1981); 4,255,475 (1981)) which requires the application of a silicone or firebrick adhesive to each edge of each inclusion within a structure. While the adhesive is still tacky, copper powder is sprinkled onto the adhesive. When the pieces are placed adjacent to one another, the layer of copper serves as a substrate which will adhere to molten solder. The combination of adhesive and copper-solder amalgam form the matrix of the structure.

DelGrande's method appears at first glance to share advantages a–c of Belcher's listed above. Further, his method is much less costly in terms of capital equipment expense than Belcher's and does not appear to involve unsafe materials and practices. However, DelGrande's method has some serious disadvantages. Although he states otherwise, his method requires substantially the same direct labor cost as the traditional copper foil method: consider that each edge of each inclusion must be coated with adhesive. This is very similar to the requirement that each edge of each inclusion be wrapped with copper foil. Note that the adhesive must be carefully and laboriously applied to the edges of each inclusion or it will coat and obscure its surface. And the labor cost of creating the copper-solder amalgam of his matrix is substantially the same as that required by the copper foil method. Thus the total labor cost for producing a structure with his matrix is dependent on the number and sizes of pieces in the structure. This cost is prohibitive when mosaic size inclusions are utilized.

A further disadvantage of DelGrande's method is that it requires that the adhesive he uses remain a permanent part of his matrix. Although he states otherwise, the adhesive is in fact not very permanent and this leads to a major disadvantage: under normal environmental conditions, the adhesive will degrade far more rapidly than the copper solder amalgam which composes the remainder of the matrix. When the matrix is flangeless and non-obscuring and the "permanent" adhesive degrades, the inclusions of glass will separate from his matrix and the structure will fail prematurely.

SUMMARY OF THE INVENTION

Accordingly, several objects and advantages of this invention are to provide a metal matrix binding inclusions in a stable structure so that:

(a) The matrix allows two opposing surface areas, the front and the back, of each inclusion to be visible. This in turn allows inclusions to be translucent when translucency is desirable.

(b) The matrix is flangeless. This characteristic allows entire surface visibility, front and back, of each inclusion even when the inclusion is mosaic size.

(c) The matrix is strong and stable.

(d) Production of the matrix does not require unsafe materials or practices.

(e) The matrix requires minimum capital equipment outlay.

(f) The direct labor cost of the matrix is minimized.

(g) The matrix does not degrade prematurely under normal environmental conditions.

These and further objects and advantages of my invention are accomplished by the following steps:

Using a temporary adhesive, one secures inclusions to a temporary backing in a desirable pattern so that there are intervals between the inclusions. Then one deposits a metal fiber substrate into the intervals between the inclusions so that the intervals are substantially filled. Any excess fiber outside the intervals is removed. Then one coats the metal fibers with a fluxing agent. Then one melts a metal infiltrate so that the infiltrate coats the individual fibers of the substrate and fills the spaces between the fibers. Upon cooling, the amalgam of substrate and infiltrate thus formed constitutes the matrix and border of the structure.

DESCRIPTION OF THE PREFERRED EMBODIMENTS

Figure 1:
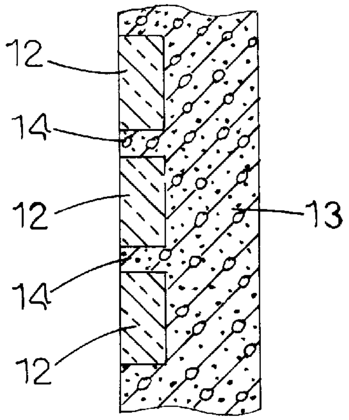
(PRIOR ART) Fig.1
FIG. 1 shows a section view of a typical mosaic structure produced according to traditional (prior art) methods.
Figure 2:
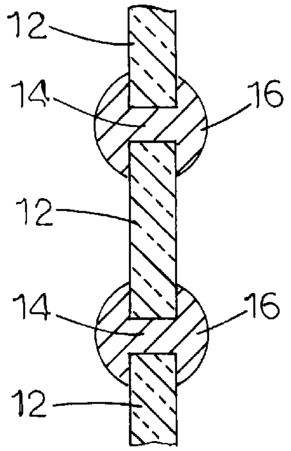
(PRIOR ART) Fig.2
FIG. 2 shows a section view of a typical stained glass structure produced according the lead came (prior art) method.
Figure 3:
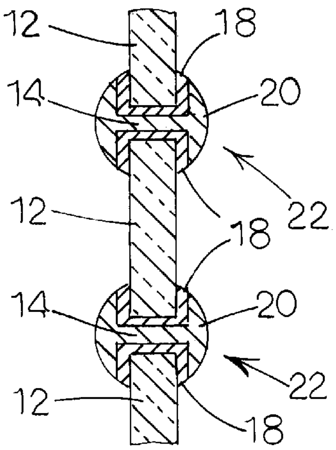
(PRIOR ART) Fig.3
FIG. 3 shows a section view of a typical stained glass structure produced according to the copper foil (prior art) method.
Figure 4:
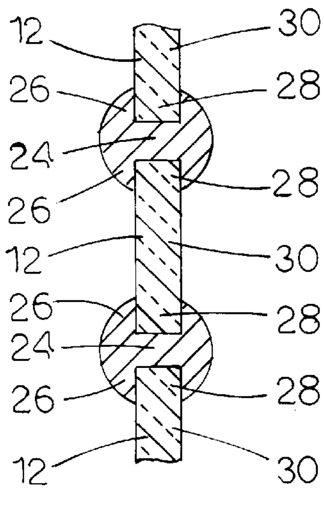
(PRIOR ART) Fig.4
FIG. 4 shows a section view summarizing the matrices of the lead came (prior art) and copper foil (prior art) methods and their flanges and noting the obscured and visible portions of the inclusions they bind.
Figure 5:
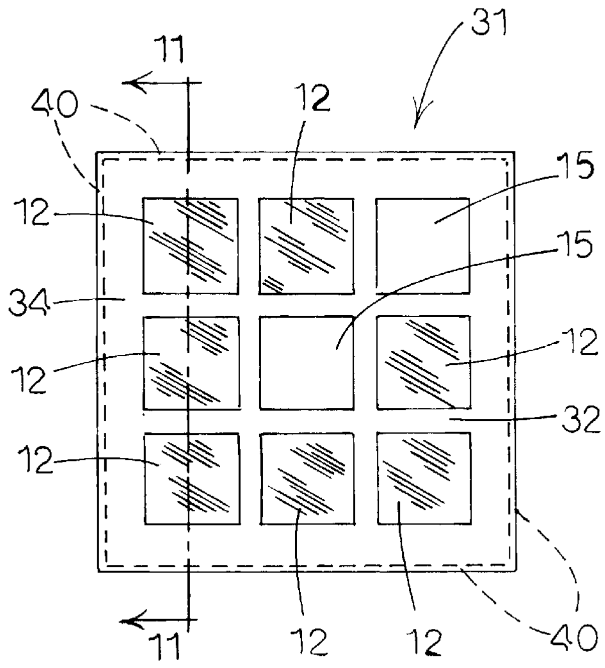
FIG. 5 shows a front view of a representative mosaic structure created by the method of this invention.

A representative mosaic structure 31 constructed in accordance with the methods of this invention is shown in FIG. 5. A set of glass inclusions 12, and bronze inclusions 15, are surrounded and bound by a continuous metal matrix 32. The glass inclusions 12 represent the class of conventionally unsolderable materials and also the class of translucent materials. The bronze inclusions 15 represent the class of conventionally solderable materials. The structure has an edging or border 34 which is continuous with the matrix 32.

Figure 6:
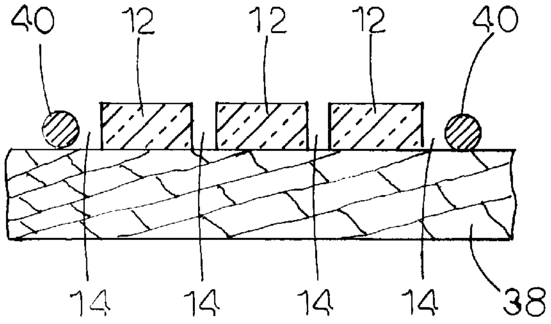
FIGS. 6, 7, 8, 9, 10, and 11 sequentially illustrate the method for constructing the matrix according to this invention, FIG. 11 also being a section view taken along the line 11—11 in FIG. 5.

The method for constructing the matrix and border is shown sequentially in FIGS. 6–11. As shown by FIG. 6, a set of inclusions 12 is joined by a temporary layer of adhesive (not shown) to a stiff temporary backing 38 at intervals 14. Border pieces 40 are also joined by the adhesive to the backing at an interval 14 around the edges of the set of inclusions 12 and the adhesive is allowed to dry completely.

The inclusions are preferably squareish, have front and back surfaces which roughly form parallel planes, are made of stained glass, are approximately 3.2 mm. thick, and have a surface area in the approximate range of 5 mm. sq. to 25 mm. sq. It is likely that they could be of almost any shape as long as each has one roughly flat surface which can be securely glued to the backing. Although it is likely that the surface areas may be of almost any size, this method achieves maximum cost-effectiveness when the surface areas are my preferred size. It is likely that the inclusions may be composed of almost any material including conventionally unsolderable materials such as glass, marble, clay, iron, etc. or conventionally solderable materials such as lead, tin, copper, brass, bronze, zinc, etc., or combinations of these metals, as long as:

1) the material is not altered in an undesirable way by temporary heat of approximately 371–427 degrees C. and, 2) the material remains bonded to the temporary adhesive and backing when subjected to this temporary heat.

The adhesive is preferably fish glue (as sold by Norland Products, Inc., New Brunswick, N.J.). Other heat resistant adhesives may be used but note that the adhesive is a temporary device and not part of the final structure. Its ease of removal is a factor.

The stiff temporary backing is preferably a flat sheet of plywood with a coat of varnish. It is likely that this backing could be composed of a variety of materials as long as the backing is stiff, somewhat heat resistant, somewhat moisture resistant, and bonds securely to the adhesive. A degree of stiffness is necessary to counteract the effects of uneven heating which occur subsequently in this method. It is likely that the backing could be other than flat, e.g., a gentle curve, like those in Tiffany lamps.

The border pieces are preferably brass, round, and 2.4 mm. in diameter. It is likely that they could be of any cross-sectional shape. It is likely that they could be of any diameter roughly approximate to the thickness of adjacent inclusions. It is likely that they could be composed of almost any material which meets the same conditions as for inclusions:

1) the material is not altered in an undesirable way by temporary heat of approximately 371–427 degrees C. and,
2) the material remains bonded to the temporary adhesive and backing when subjected to this temporary heat.

The border pieces are a part of the final structure in my preferred embodiment but they are not a necessary part of the final structure in all embodiments.

The size of the interval between the inclusions is preferably 1–2 mm. It is likely that interval sizes larger than this range are possible. It is likely that interval sizes smaller than this range may be possible under conditions mentioned later.

Figure 7:
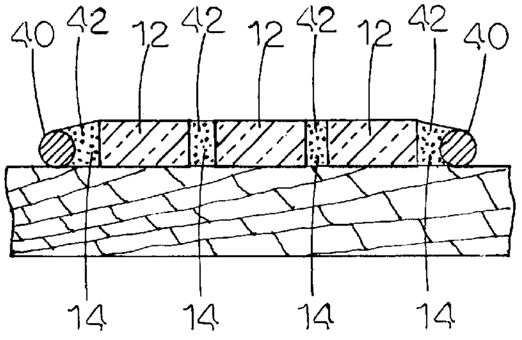

As shown by FIG. 7, a quantity of metal fiber 42, the substrate of the matrix, is placed in the intervals 14 between the inclusions 12 and between the inclusions 12 and the border pieces 40 so that the intervals 14 are substantially filled. The metal fiber 42 represents both conventionally solderable metal fibers and conventionally unsolderable metal fibers. The primary function of the border pieces 40 is to help hold the fiber 42 in place.

The substrate is preferably grade fine bronze fiber also known as fine bronze chopped wool, as sold by International Steel Wool Corp., Springfield, Ohio. The strands of this fiber are reportedly 0.03–0.06 mm. in diameter and reportedly have a nominal length of 6.35 mm. It is likely that metal fiber made in other grades could work. It is likely that grades larger than fine might work well with intervals substantially larger than my preferred range of 1–2 mm. wide and 3.2 mm. deep. It is likely that grades smaller than fine would work with my preferred intervals of 1–2 mm. and such finer grades might even enable smaller intervals; however, such finer grades are apparently not commercially available. It is likely that the fiber may be made of materials other than bronze. Fiber made of a conventionally solderable metal other than bronze is an obvious possibility. Fiber made of conventionally unsolderable metals might work under some circumstances. In general, the choice of substrate material is codetermined by the choice of infiltrate material, flux, and the amount of heat required to form substrate and infiltrate into a stable amalgam. Those choices may impact the choices of adhesive and backing material.

My preferred method of placing the metal fiber substrate in the intervals utilizes a container with a removable lid. This lid has holes drilled in it of approximately 4 mm. diameter. This lid is removed, the container is partially filled with the fiber substrate and the lid is secured. The container is shaken like a salt shaker over the intervals so that the fibers separate and fall through the holes in the lid and into the intervals. After the intervals are filled, any excess fiber which has fallen onto the glass surfaces is removed. Note that it is this method of placing the substrate in the intervals which enables my method to achieve cost effectiveness over DelGrande's method of coating the edges of each inclusion with adhesive and then coating the adhesive with metal particles. It is likely that other methods of placing the substrate in the intervals might work as long as such methods loosen the individual fibers and allow them to resettle and recompact into the intervals.

Figure 8:
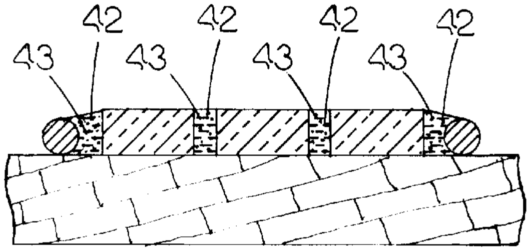

As shown in FIG. 8, a fluxing agent 43 is then applied to the metal fiber substrate 42.

My preferred agent is oleic acid mixed with alcohol in a proportion of 3.5 parts oleic acid by volume to 1 part alcohol by volume. My preferred method of application is to spray this mixture using a spray bottle. It's likely that other flux mixtures and fluxes and methods of application could work.

Figure 9:
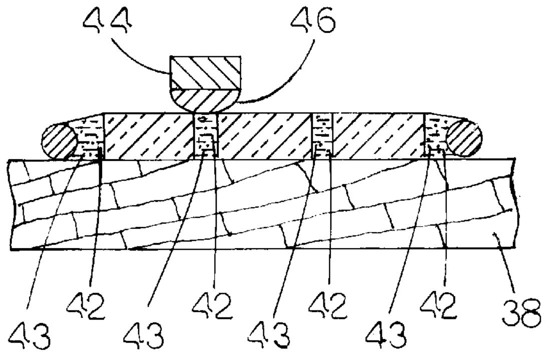

As represented by FIG. 9, a heated plate 44 and a molten metal infiltrate 46 are brought into proximity to the substrate 42 and flux 43. The molten metal infiltrate 46 represents both conventional, i.e., tin-based, solders and unconventional solders. Upon touching the substrate and flux, the molten infiltrate coats the individual fibers of the substrate and fills any spaces between the fibers. Note that the backing 38 should be level at the point of contact between substrate and infiltrate. The quantity of infiltrate 46 used should be sufficient to substantially fill all intervals to the surface of at least one of the inclusions surrounding each interval. The infiltrate is allowed to cool and solidify.

The heated plate is preferably a Weller 371 degree C. or a Weller 427 degree C. soldering tip fitted to a Weller W100 temperature-controlled soldering iron as available from CooperTools, Apex, N.C. However, many soldering iron/tip combinations would function equally well with my preferred substrate/infiltrate choices as long as the tip temperature is held steady in the 371–427 degree C. range. The process will partially function at a somewhat lower temperature, e.g., 315.6 degrees C., but not as well. Temperatures higher than 427 degrees C. might work but could prove overly destructive to the temporary glue bonds which hold the inclusions in place.

It is likely that the heated plate could be other than a soldering iron tip. One possibility is a plate with a cast-in heating element which can be maintained at a stable temperature of 371–427 degrees C. If such a plate were larger than a typical soldering iron tip, it might reduce labor time. However, use of such a plate might also lead to diminished matrix quality.

My preferred infiltrate is 60/40 tin/lead solder in solid core wire form. It is likely that other conventional, i.e., tin-based, solders, including lead-free can also produce satisfactory results. Note that lead-free solders may require use of a fluxing agent other that my preference. Lead-free 95/5 tin/antimony, for example, works better with a petroleum jelly/zinc chloride/ammonium chloride flux such as Oatey no. 5 lead-free flux than it does with oleic acid. The choice of an metal infiltrate other than conventional solder might work if it forms a stable amalgam with a chosen substrate which is a metal fiber of conventionally unsolderable material.

Figure 10:
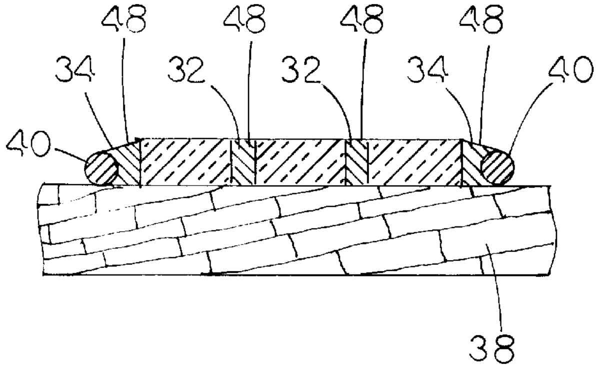

As represented by FIG. 10, upon cooling, the metal fiber substrate and the infiltrate form an amalgam 48. This amalgam is in fact the matrix 32 and border 34 of this invention. When my preference of border pieces 40 is used, they are incorporated into the amalgam of the border 34. The structure is pried or lifted from the backing 38 and any adhesive or fluxing agent adhering to the inclusions, matrix, or border is removed. Water suffices to remove fish glue. Several agents, including mineral spirits, remove oleic acid.

Figure 11:
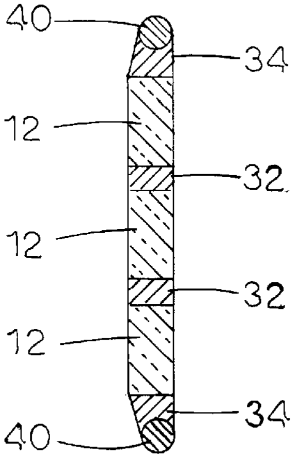

FIG. 11 shows the final result. It is a section view of FIG. 5 along the line 11—11. It displays the inclusions 12, the matrix 32, the border 34, and the border pieces 40.

The reader will see that this invention provides a metal matrix binding inclusions in a structure in such a way that, a) the matrix allows two opposing sides of each inclusion to be visible. This enables translucency in the inclusions and in the structure as a whole.
b) The matrix is strong and durable. The use of metal fiber as an integral component of the matrix gives it a strength and rigidity which may well be greater than that of matrices composed solely of infiltrate as is Belcher's. The matrix, unlike DelGrande's, avoids the incorporation of materials which would compromise its structural integrity.

c) the matrix is flangeless. This allows maximum visibility of the surface areas of the inclusion when viewing the structure from front or back. It allows translucency when using small inclusions.

d) the matrix is cost-conscious and cost-effective in comparison with the matrix of other methods which strive for the same objectives. It requires far less capital outlay than Belcher's method and considerably less direct labor time than DelGrande's matrix.

e) The matrix does not require the use of unsafe materials or practices for its production as does Belcher's.

The reader will also see that the structures produced by this invention might well have use as windows or lamps or free-standing screens or sculptures exposed to ambient or artificial light. Indeed, one might say that this invention enables core values from the fields of stained glass and mosaic to be embodied in a single structure. However, both the specifics of my description above and the overall spirit of this invention, i.e., that inclusions, metal fiber substrate, flux, metal infiltrate, heat, temporary adhesive, and temporary backing interact to form a unified structure where opposing surfaces of the inclusions are visible and unobscured, give this invention a broad range of applications. Accordingly, the scope of this invention should be determined by the appended claims instead of examples given.

I claim:

1. A structure comprising:

a set of inclusions separated from one another so that an interval is present between adjacent inclusions and, a metal matrix means for substantially filling said intervals and, said matrix comprising a substrate of metal fibers and a metal infiltrate means for coating said fibers and filling any spaces between said fibers, whereby said set of inclusions and said matrix form a unified structure.

2. The structure of claim 1 wherein said set of inclusions comprises inclusions made of conventionally unsolderable material.

3. The structure of claim 1 wherein said set of inclusions comprises inclusions made of translucent material.

4. The structure of claim I wherein said set of inclusions comprises inclusions made of glass.

5. The structure of claim 1 wherein said fiber substrate comprises a conventionally solderable material and said metal infiltrate coating and filling means comprises conventional solder.

6. The structure of claim 5 wherein said set of inclusions comprises inclusions made of conventionally unsolderable material.

7. The structure of claim 5 wherein said set of inclusions comprises inclusions made of translucent material.

8. The structure of claim 5 wherein said set of inclusions comprises inclusions made of glass.

9. A method for building a structure comprising the steps of positioning a set of inclusions so that an interval separates adjacent inclusions, and placing a substrate of metal fibers into said intervals, and coating said substrate fibers and filling the spaces between said fibers with a metal infiltrate so that said substrate fibers and said infiltrate form a matrix which substantially fills said intervals, whereby said set of inclusions and said matrix are formed into a unified structure.

10. The method of claim 9 wherein said set of inclusions comprises inclusions made of conventionally unsolderable materials.

11. The method of claim 9 wherein said set of inclusions comprises inclusions made of translucent material.

12. The method of claim 9 wherein said set of inclusions comprises inclusions made of glass.

13. The method of claim 9 wherein said fibers comprise fibers made of conventionally solderable material and said metal infiltrate comprises metal infiltrates made of conventional solder.

14. The method of claim 13 wherein said set of inclusions comprises inclusions made of conventionally unsolderable material.

15. The method of claim 13 wherein said set of inclusions comprises inclusions made of translucent material.

16. The method of claim 13 wherein said set of inclusions comprises inclusions made of glass.

* * * * *